United States Patent [19] [11] 4,002,067
Kugler [45] * Jan. 11, 1977

[54] LOW FRICTION ABSOLUTE PRESSURE CONTINUOUS INTEGRATOR

[75] Inventor: Carl John Kugler, Philadelphia, Pa.

[73] Assignee: The Singer Company, New York, N.Y.

[ * ] Notice: The portion of the term of this patent subsequent to Mar. 20, 1990, has been disclaimed.

[22] Filed: Dec. 10, 1975

[21] Appl. No.: 639,557

Related U.S. Application Data

[63] Continuation-in-part of Ser. No. 472,246, May 22, 1974, Pat. No. 3,946,609.

[52] U.S. Cl. .............................................. 73/233
[51] Int. Cl.² ........................................ G01F 1/12
[58] Field of Search ............... 73/233, 194 R, 32 R, 73/393

[56] References Cited

UNITED STATES PATENTS 3,721,125  3/1973  Kugler ......................... 73/233 X
3,946,609  3/1976  Kugler ........................... 73/233

Primary Examiner—Richard C. Queisser
Assistant Examiner—Stephen A. Kreitman
Attorney, Agent, or Firm—Robert E. Smith; Edward L. Bell; Harold Weinstein

[57] ABSTRACT

A low friction absolute pressure continuous integrator having a vacuum pressure chamber carried by a frame and in which a pressure sensing means is mounted. The pressure sensing means is adapted to expand or contract in a straight line responsive to changes in the line pressure of the fluid flow of the meter. Either the chamber or the pressure sensing means is in communication with the absolute line pressure of the fluid flow, with the other one being evacuated to substantially zero absolute pressure. A link transfer assembly interconnects the pressure sensing means with a continuous integrator assembly whereby variations of the absolute line pressure are converted to a standard pressure to permit totalizing of the standard volume at a corrected counter. An uncorrected totalized volume is simultaneously taken at an uncorrected counter. The working pressure for a device embodying the present invention is in the range of 0–45 psig. In order to greatly reduce losses due to friction and hysteresis, and the factor of non-repeatability in the measurement, the link transfer assembly uses an improved arrangement which includes a knife edge and groove transfer link support whereby the linear motion of the pressure sensing means within the chamber is transferred externally of the chamber by a nonlinear motion of the transfer link. In the preferred embodiment the knife edge and groove is spring-loaded through the transfer link.

8 Claims, 6 Drawing Figures

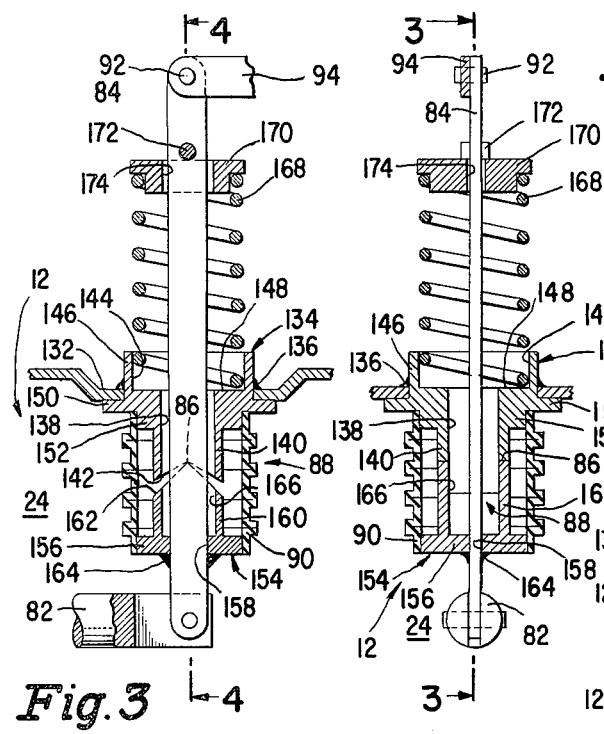
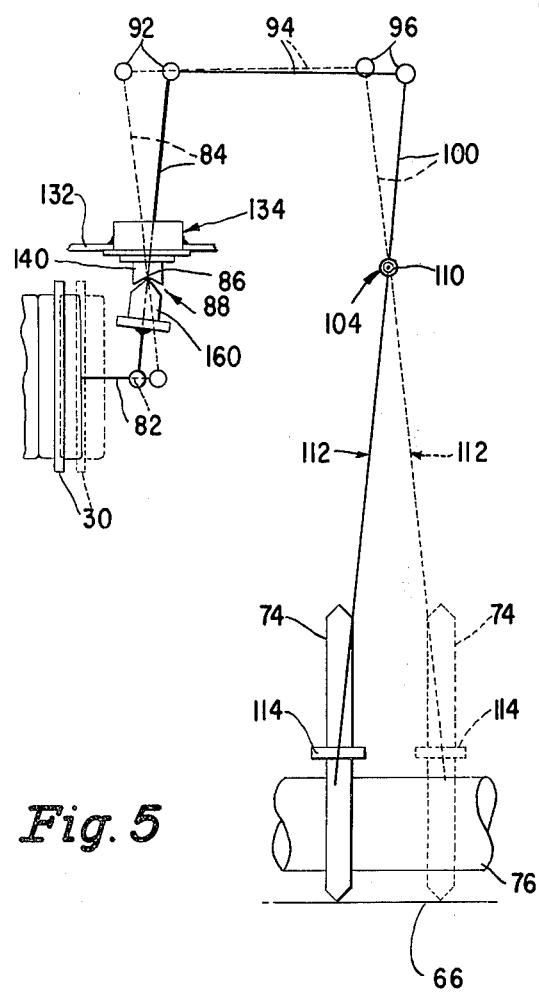
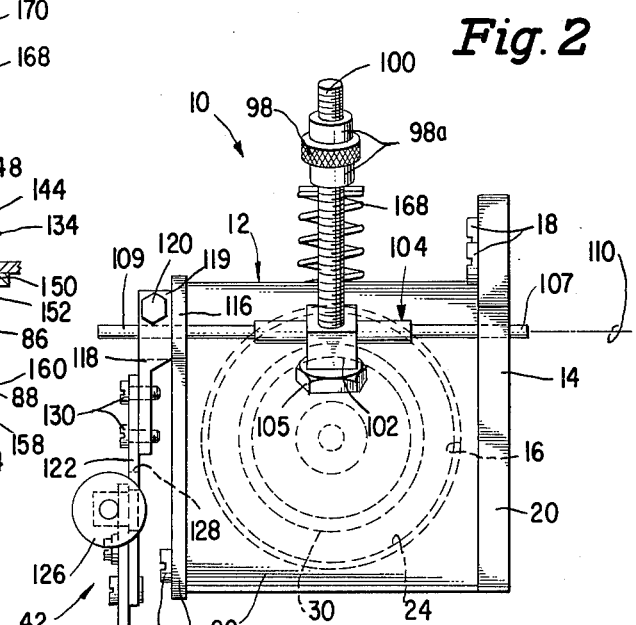
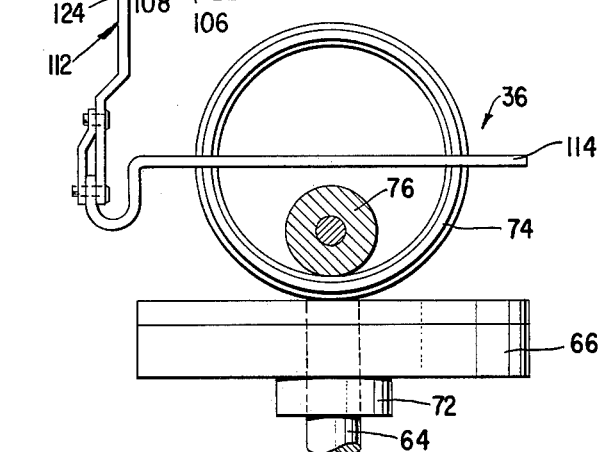

LOW FRICTION ABSOLUTE PRESSURE CONTINUOUS INTEGRATOR

CROSS-REFERENCE TO RELATED APPLICATION

This application is a continuation-in-part of my copending application, Ser. No. 472,246, filed May 22, 1974, for "Barometrically Compensated Pressure Index Continuous Integrator For Measuring Throughput Fluid Flow Of Meters", now U.S. Pat. No. 3,946,609.

BACKGROUND OF THE INVENTION

Previous types of pressure compensating devices employing continuous integrators were used to obtain corrected volumetric gas measurements for meters, and provided for variations in the pressure and/or temperature of the fluid flow. A complete disclosure of one type of continuous integrator may be had by reference to U.S. Pat. Nos. 3,538,766 and 3,780,580.

The pressure corrections apply to a continuous integrator and are based upon Boyle's law, as follows:

$$Q = q \frac{A + p}{Pb}$$

$Q$ = the volume of gas at a standard or base pressure.
$q$ = the uncorrected or actual line volume of gas measured by the meter.
$A$ = the atmospheric pressure at the point of measurement in pounds absolute.
$p$ = the gauge pressure.
$Pb$ = the standard or base pressure in pounds absolute.

Thus, the volume of measured gas corrected to standard or base pressure will be seen to be a function of the ratio of absolute pressure at the point of measurement and at the desired standard or base pressure.

In the co-pending absolute pressure continuous integrator, use was made of a sealed evacuated bellows which served as a pressure sensing means which was located within the pressurized chamber, so as to permit the bellows to move proportionately to the level of line pressure within the chamber. In order to utilize the motion caused by the fluctuation in line pressure, a link transfer assembly is utilized to interconnect the bellows with the continuous integrator. Declining directly in absolute pressure requires that a vacuum pressure chamber be used. It therefore becomes necessary to take the link transfer assembly through a wall of the chamber in a leak-free and friction-free fashion to maintain the absolute pressure therein. In the co-pending application, this was accomplished by use of a toggle link pivoting on a pin, and being sealed by a flexible bellows. However, the range of pressure for such a construction is limited to that of 0–5 psia or slightly higher, and use of the continuous integrator at higher pressures results in frictional losses, hysteresis lag and a certain degree of non-repeatability in measurement, i.e., measurement inaccuracy.

SUMMARY OF THE INVENTION

It is therefore an object of the present invention to provide an improved absolute pressure continuous integrator which overcomes the prior art disadvantages; which is simple, economical, accurate and reliable; which measures the volume of fluid flow in terms of absolute pressure passing through the meter; which reads the absolute pressure directly; which includes an improved link transfer assembly to interconnect the pressure sensing means located within the vacuum pressure chamber and the continuous integrator; which has a link of the transfer assembly sealingly extend outwardly through the vacuum pressure chamber and to partake of non-lineal motion at said exit location; which has a link of the transfer assembly that is supported by and moves responsive to a knife edge and groove arrangement adjacent the exit location of said link; which uses a spring-loaded link to exit the vacuum pressure chamber with the motion thereof being controlled by a supporting knife edge and groove arrangement to translate the linear motion of the pressure sensing means into a non-lineal motion at the exit of the vacuum pressure chamber; and which device is operable in the pressure range of 0–45 psig.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which:

FIG. 2 is an end elevational view, partly in section, of the absolute pressure continuous integrator taken along line 2—2 of FIG. 1.

FIG. 3 is a front elevational view, partly in section, of the improved link of the transfer assembly exiting the vacuum pressure chamber, and taken along 3—3 of FIG. 4.

FIG. 4 is an end elevational view, partly in section, taken along line 4—4 of FIG. 3.

FIG. 5 is a schematic diagrammatic representation showing the link transfer assembly, and the transfer of motion from the pressure sensing element in the vacuum pressure chamber to a ring of the continuous integrator assembly.

FIG. 6 is an enlarged front elevational view of the improved knife edge and groove arrangement supporting the motion of the link of the transfer assembly as it exits the vacuum pressure chamber.

DESCRIPTION OF THE INVENTION

Figure 1:
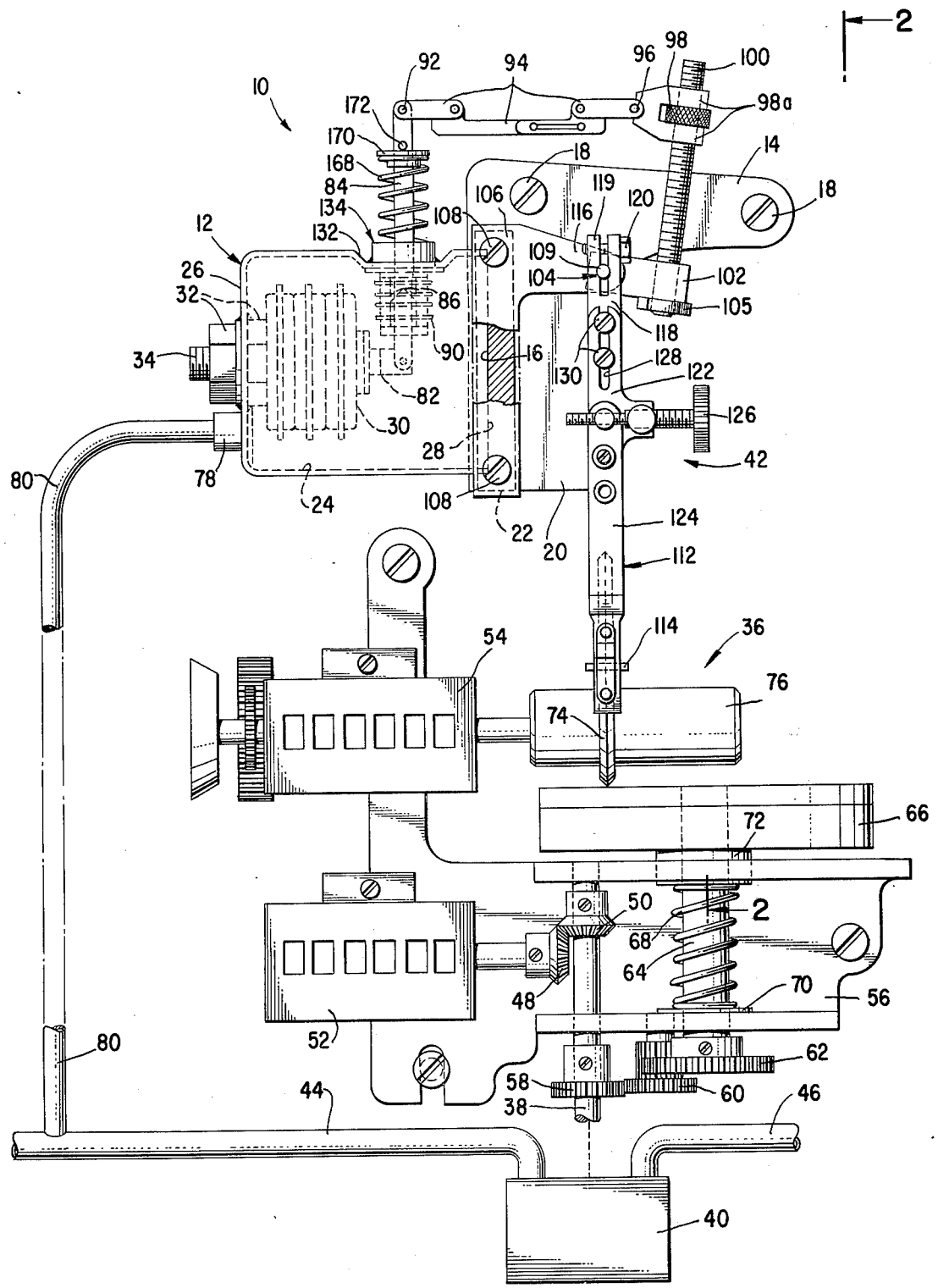
FIG. 1 is a front elevational view of an absolute pressure continuous integrator embodying the present invention.

In the illustrated embodiment of the invention, FIG. 1 shows an improved pressure continuous integrator, designated generally as 10, having a vacuum pressure chamber assembly 12 affixed to the bracket 14. The bracket 14 itself is mounted on an inner wall (not shown) of a meter housing by fastening means such as screws 18. The bracket 14 is conveniently an "L"-shaped member having an inner leg 20 shown in FIGS. 1 and 2, and an outwardly extending leg 22 best shown in FIG. 2.

The vacuum pressure chamber assembly 12 illustrated in FIGS. 1 and 2, has a hollow interior or chamber 24 which is substantially cylindrically shaped and closed at one end or wall 26 and is provided at the other end thereof with an opening 28 which is received in and sealingly secured to a central circular recess 16 formed in the outwardly extending leg 22 so as to affix the chamber assembly 12 to the bracket 14. A pressure sensing element or bellows 30 is affixed within the interior chamber 24 of the chamber assembly 12 at the closed end 26 thereof, as best seen in FIG. 1 and secured in position by a pair of nuts 32 threadedly connected on opposite sides of the end 26 to a threaded member 34 affixed to the bellows 30.

Mounted also within the meter housing, below the pressure chamber assembly 12, is a continuous integrator assembly 36 driven by an output shaft 38 of a meter 40. A link transfer assembly, indicated generally by reference numeral 42, interconnects the bellows 30 and the continuous integrator assembly 36. As will be apparent from the ensuing description of the invention, such interconnection enables regulation of the output of the integrator in accordance with variations in the absolute pressure being measured.

As shown in FIG. 1, meter 40 is employed to measure the throughput fluid flow which enters by means of an inlet conduit 44 and exits the meter via an outlet conduit 46. The fluids measured are compressible fluids such as a gas or vapor. As is conventional, the output shaft 38 of the meter 40 transmits the meter output by means of a pair of bevel gears 48, 50 to an uncorrected counter 52 which is used to provide a visual check of the operation of the meter 40. The output shaft 38, counter 52, as well as a corrected counter 54, and selected elements of the continuous integrator assembly 36, are carried by a lower frame 56, which is also part of the meter housing.

Thus, the shaft 38 is journaled in the lower frame 56, and, in addition to the bevel gear 50, has a pinion 58 secured thereto for driving engagement through gears 60 and 62 with a shaft 64. The shaft 64 is journaled in the frame 56 and carries at its upper end a friction disc 66. In this simplified construction, a coil spring 68 which encircles the shaft 64, is disposed between a pair of collars 70, 72 on the shaft 64 and urges the friction disc 66 upwardly into engagement with a ring 74 to clamp such ring between the disc 66 and a roller or drum 76. As previously stated, ring integrators are known and a more complete understanding of such devices may be had by reference to U.S. Pat. No. 3,538,766.

According to the preferred embodiment of the invention, the cylindrical chamber assembly 12 is mounted onto bracket 14 at one end 28 thereof. The other end 26 of chamber assembly 12 has a sleeve 78 affixed thereto, and also carries the bellows 30. The sleeve 78 is dimensioned to receive one end of a capillary tube 80 which is connected at its other end with the inlet conduit 44 containing the fluid to be metered. Thus, the fluid pressure within the inlet conduit 44 is communicated to the chamber 24. Any fluctuations in fluid pressure within the conduit 44 are communicated via the capillary tube 80 to the chamber 24.

The pressure sensing element or bellows 30, positioned within the chamber 24, may be fabricated from a plurality of diaphragms to form a diaphragm stack as is known. The pressure sensing element 30 illustrated in FIG. 1, is secured at one end thereof to end wall 26 and is extendible linearly at its other end so as to shift a rod 82 in response to changes in pressure within the chamber 24. The pressure sensing element 30 is evacuated to substantially zero absolute pressure. Thus, the pressure sensing element 30 establishes a zero reference pressure against which variations in the pressure within conduit 44 can be compared and translated into pressure compensation for the continuous integrator assembly 36 through link transfer assembly 42.

Push rod 82 is fixedly connected at one end thereof to the pressure sensing element 16, as shown in FIG. 1. A transfer link 84 is secured pivotally to the other end of the push rod 82 and is fulcrummed at 86 by knife edge-groove support assembly 88 which is located within a bellows seal 90 illustrated in FIGS. 3, 4 and 6, and as described more fully hereinafter.

The transfer link 84 is formed to sealingly exit chamber 24 by extending through bellows seal 90 and is pivotally connected at the free end thereof by a pivot pin 92 to one end of an adjustable link member 94. The other end of link 94 is connected by means such as a pivot pin 96 with an adjustable nut 98 threadedly connected to one end of a threaded adjustment arm 100. Pivot pins 92 and 96 may be replaced with ball bearing pivots in which a ball is affixed to one of the connecting links and is disposed within an aperture formed in the other link member and held in position by a spring finger secured to the first link having the ball. Such pivotal arrangements are well known. Adjustment arm 100 includes a screw shank which carries the adjustment nut 98 entrapped within collars 98a, at its upper end. The lower end of screw shank of arm 100 is threadedly received in a tapped hole formed in a yoke arm 102 which is now not actively secured to a shaft 104. By means of the adjustment nut 98 the length of arm 100 can be adjusted. A nut 105 serves to clamp the arm 100 onto the yoke arm 102 as illustrated in FIGS. 1 and 2.

Bracket 14 serves to journal the reduced end portions of shaft 104 with one end 107 journaled in the inner leg 20 and the other end 109 journaled in an extension bracket 106 affixed to the outer leg 22 by means of screws 108. A fixed pivot axis 110 is established by shaft 104 about which a lower link 112 may pivot to thereby position a yoke 114 and the ring 74 rotatively trapped therewithin at varying radial locations on the surface of friction disc 66. The extension bracket 106 has a depending portion 116 which is provided with an opening therethrough to journal reduced portion 109 of shaft 104. Inner leg 20 of bracket 14 has an opening dimensioned to journal reduced portion 107 of shaft 104.

Lower link 112 comprises upper segment 118 in the form of a bifurcated yoke 119 the slot of which is configured to receive the reduced end portion 109 of shaft 104 therewithin. A screw 120 is threadedly received within aligned openings in the spaced arms of yoke 119 to secure the yoke 119 fixedly to shaft 104 for rotation therewith. Lower link 112 further includes arms 122, 124 which are interconnected by means of an adjustment screw 126 by means of which the position of arm 124 may be adjusted relative to arm 122.

It will also be observed from FIGS. 1 and 2 that arm 122 is formed with a longitudinal slot 128 through which screws 130 extend and are threadedly received in upper yoke segment 118. In this manner the link 112 may thus have the length thereof adjusted as desired.

Secured to the lower end of link 112 is the yoke 114. The yoke 114 extends in a direction substantially perpendicular to the lower link 112 and is provided with a longitudinal slot within which ring 74 is rotatively trapped. The ring 74 encircles roller 76 and, as stated previously, is clamped between the roller 76 and friction disc 66 by virtue of the disc being urged upwardly under the force of spring 68.

The disc 66 will be rotated about the axis of shaft 64 which, in turn, is driven off the meter output shaft 38 through gearing 58, 60 and 62. The ring 74 is rotated by disc 66 and drives roller or drum 76 which is journaled at one end thereof (not shown) within the frame for corrected counter 54. The preferred mounting of roller 76 is by means of a double bearing within the frame for counter 54 with the other end of the roller 76 being cantilevered as shown. It will be noted that the roller 76 and ring 74 are thus driven at a speed which is commensurate with the radial distance from the axis of shaft 64 to the point at which ring 74 rides on the disc 66.

In operation, and as shown diagrammatically in FIG. 5, as the line pressure within inlet conduit 44 increases, due either to changes in barometric pressure or in the composition of the gas, the pressure increase is communicated via capillary tube 80 to the interior chamber 24 of the chamber assembly 12. The increased pressure causes the pressure sensing element 30 to contract. This results in a shifting of push rod 82 to the left as viewed in FIG. 5 and nonlinear movement of transfer link 84 about its fulcrum at 86 of the knife edge-groove support assembly 88 as shown in FIGS. 5 and 6. Link member 94 and adjustment arm 100 are caused to swing as shown, the arm 100 effecting pivotal movement of yoke arm 102 and shaft 104. The shaft 104 rotates in a clockwise direction about its axis 110 and carries with it the lower link 112. The yoke 114 is caused to steer the ring 74 in the manner of the front wheel of a bicycle. As soon as the ring 74 is tilted it attempts to straighten itself out and realign itself with the repositioned end of yoke 114 adjacent the portion of lower link 112 which has been shifted. Such realignment results in movement of the ring 74 to a new radial location along the disc 66 so as to drive roller 76 at an increased speed representative of the increase in absolute pressure of the gas being measured.

It will thus be appreciated that by arranging the pressure sensing element 30 within the chamber 24 such that there is a pressure differential which is measured against a nearly perfect vacuum the variation in pressure being measured is absolute pressure. When there are barometric pressure changes they will not directly lead to expansion or contraction of the pressure sensing element 30 because the pipeline 44 pressure has not changed. However, the pipeline 44 is generally provided with a regulator and pressure gage (not shown). If, for example, the regulator has been set to maintain a set pressure within the range of 0–45 pound gage pressure, when the atmospheric pressure changes the regulator will sense the change and regulate the absolute pressure in the pipe (upwardly or downwardly) to maintain the required set pound gage pressure, thus a differential from the standard or base pressure exists and would be reflected in the volume of fluid flow. According to prior art devices the corrected volume would not change (and thus the consumer would be billed for the same volume of gas (even though such volume actually changed) because the set pound gage pressure would have remained constant. By the compensating mechanism of the present invention, when the regulator adjusts the line pressure to reflect the change in atmospheric pressure this is immediately sensed by the pressure sensing means 30 within chamber 24 and by means of the link transfer assembly 42 the ring 74 of the continuous integrator assembly 36 is repositioned on disc 66 to impart to roller 76 the proper representative rotational speed and thus the corrected counter 54 will reflect the volume of the gas corrected to the standard or base pressure.

The absolute pressure continuous integrator 10 has an operative pressure range of 0–45 psig that is made possible by the use of the novel knife edge-groove support assembly 88 depicted in FIGS. 3 and 4, diagrammatically represented in FIG. 6. The vacuum pressure chamber assembly 12 has an annular dimple 132 formed on its upper surface and in which is fitted an upper support 134 which is soldered thereto as at 136, so as to form a seal therebetween. The upper support 134 has a central opening 138, the lower portion of which terminates in an upper sleeve 140. A "V" groove 142 is formed on diametrically opposite sides of the undersurface of the upper sleeve 140. The upper support 134 is counterbored as at 144 to form a guide port sleeve 146 which extends upwardly through the annular dimple 132 and is joined thereto by the soldered seal 136. The top of the guide sleeve 146 is open and the bottom terminates in a shoulder 148. The upper support 134 has a radial flange 150 which rests on the underside of the dimple 132 within the chamber 24 and the lower portion thereof, defines an annular shoulder 152 which is formed intermediate the end of the radial flange 150 and the surface of the upper sleeve 140. The upper end of the sealing bellows 90 is closely fitted about and preferably cemented to the shoulder 152 to form a seal therebetween.

A lower support 154 includes an annular bottom plate 156, of substantially the same diameter as the annular shoulder 152, and has a central slot 158 sized to receive the transfer link 84 therethrough. A lower sleeve 160 extends upwardly from the bottom of plate 156 about the slot 158, and has its leading edge formed in a knife edge 162 having points positioned on diametrically opposite sides from the longitudinal dimension of the slot 158. The lower sleeve 160 is fitted upon the transfer link 84 and soldered as at 164 adjacent the lower end thereof upwardly from its pivotal connection to the push rod 82. The lower sleeve 160 has a central opening 166 which terminates at the bottom plate 156. Placing the transfer link 84 through the central opening 138 of the upper support 134 causes central opening 138 and 166 to align, thus placing the knife edge 162 in contact with the V groove 142 so as to position the respective points of each to contact the other at the fulcrum 86. In this position, the lower portion of sealing bellows 90 will closely encircle the outer perimeter of the bottom plate 156, whereby it is sealingly affixed thereto as by cement or the like. In order to remove or lessen any forces from the sealing bellows 90, as a result of the non-lineal motion of the transfer link 84, a spring 168 is fitted about the upper portion of the transfer link 84 on the outside of the chamber 24 with its lower edge within the guide sleeve 146 and resting upon the shoulder 148 of the upper support 134. The upper end of the spring 168 is contacted by a spring cap 170 which is disposed about the transfer link 84, and will place the spring in slight compression by being held in a lowered position by a stop pin 172 which fits through an aperture in the transfer link 84 and extends across a slot 174 of the spring cap 170 through which the transfer link 84 is extended. The upper end of the transfer link 84 is connected to the link 94 by a pivot pin 92 to complete the assembly of the transfer link 84. Since the transfer link 84 is spring-loaded by the spring 168, so will be the knife edge-groove support assembly 88, so as to form a positive connection between the upper sleeve 140 and the lower sleeve 160 at the fulcrum 86. The angle at the point of the V groove 142 is greater than the angle at the point of the knife edge 162 so as to permit a sturdy construction and friction-free movement therebetween at the fulcrum 86. The movement at fulcrum 86, being a point contact, is substantially friction-free. The solder connections at 136 and 164 serve, along with the cemented connections of the sealing bellows 90 to the upper support 134 and lower support 154, respectively, to form and maintain the sealed integrity of the chamber 24 and prevent exposure to the atmospheric pressure therein, or leakage of the line absolute pressure therefrom. The sealing bellows 90 is substantially flexible so as to permit any motion of the support assembly 88 or the transfer link 84. The central apertures 138 and 166 are sufficiently large to permit the non-lineal motion of the transfer link 84 without the same contacting the walls thereof. The present arrangement permits the transfer link 84 to exit the sealed chamber 24 and to partake of friction-free non-lineal movement. Thus, the working pressure of the absolute pressure continuous integrator 10 can be in the higher pressure range of 0–45 psig, than was previously possible, and permits the link transfer assembly 42 to operate substantially friction-free, with the minimal hysteresis lag and a high repeatability factor in all measurements of the device.

It will be understood that various changes in the details, materials, arrangements of parts and operating conditions which have been herein described and illustrated in order to explain the nature of the invention, may be made by those skilled in the art within the principles and scope of the invention.

Having thus set forth the nature of the invention, what is claimed herein is:

1. An absolute pressure continuous integrator device for measuring the absolute pressure of the volume of the throughput fluid flow of a line having a meter connected therein, which device comprises:
   a. a housing having a chamber sealed from atmospheric pressure therein,
   b. a pressure sensing means mounted in the housing and having one end extending in the chamber freely to move responsive to changes in the line absolute pressure,
   c. conduit means connected between the line and the housing to communicate line absolute pressure to one or the other of the chamber or the pressure sensing means, with the other being evacuated to substantially zero absolute pressure whereby changes in the line absolute pressure will be sensed by the pressure sensing means,
   d. a link transfer assembly having one end connected within the chamber to the free end of the pressure sensing means,
   e. a flexible seal means connected to the housing in sealed communication with the chamber to permit the link transfer assembly to sealingly exit the chamber,
   f. a continuous integrator assembly associated with the meter and connected to and operated responsive of movements of the other end of the link transfer assembly,
   g. the link transfer assembly includes a transfer link which sealingly exits the chamber at the seal means, and
   h. a support assembly sealingly interconnected between the housing and the transfer link, and to shift in substantially friction-free, non-lineal movement responsive to changes of the position of the pressure sensing means, to cause the transfer link of the link transfer assembly to shift correspondingly.

2. The combination claimed in claim 1 wherein:
   a. the support assembly includes a pair of interconnected support members, one connected to the housing, and the other connected to the transfer link, and
   b. the pair of support members engaging each other in substantially friction-free non-lineal point contact, whereby the transfer link is forced to partake to the same motion.

3. The combination claimed in claim 2 wherein:
   a. the support member connected to the housing is an upper member,
   b. the support member connected to the transfer link is a lower member,
   c. the upper member has a V-shaped groove formed at its lower end,
   d. the lower member has a knife-edge formed at its upper end, and
   e. the lower member engages the upper member with the knife-edge making point contact within the V groove thereof.

4. The combination claimed in claim 3 wherein:
   a. a spring means is operatively associated with the support assembly to urge the members thereof into engagement.

5. The combination claimed in claim 4 wherein:
   a. the spring is disposed on the side of the housing external of the chamber.

6. The combination claimed in claim 5 wherein:
   a. the support assembly is disposed on the side of the housing internally of the chamber.

7. The combination claimed in claim 3 wherein:
   a. the transfer link extends internally through the support assembly and is sealingly connected to the lower member.

8. The combination claimed in claim 7 wherein:
   a. a spring is interconnected between the external portions of the transfer link and the upper support to urge the support members into engagement.

* * * * *